Sept. 23, 1958  G. W. JONES  2,852,832

HOSE CLAMP FOR THIN WALL TUBES

Filed Feb. 8, 1954

INVENTOR.
GOMER W. JONES
BY
Lyon&Lyon
ATTORNEYS

United States Patent Office 2,852,832
Patented Sept. 23, 1958

2,852,832

HOSE CLAMP FOR THIN WALL TUBES

Gomer W. Jones, Wichita, Kans., assignor to National Utilities Corporation, Pasadena, Calif., a corporation of California Application February 8, 1954, Serial No. 408,644

10 Claims. (Cl. 24—279)

My invention relates to hose clamps and included in the objects of my invention are:

First, to provide a hose clamp which is particularly suited for clamping hose on to thin wall tubes in that the constriction pressure exerted by the clamp is uniformly applied to the hose and tube so as to firmly secure the hose without causing the tube to collapse.

Second, to provide a hose clamp which completely envelopes the hose and incorporates circumferentially overlapping tongues backed by a reinforcing band so as to avoid any gap into which the hose can expand or fold.

Third, to provide a hose clamp including a band having circumferentially elongated loop ends which receive a tie bolt and are so arranged that the loops extend circumferentially beyond the points of tangency with the band thereby to facilitate contraction without distortion of the band from a true circle.

Fourth, to provide on the whole a hose clamp which is economical of manufacture and dependable in operation.

With the above and other objects in view, as may appear hereinafter, reference is directed to the accompanying drawings, in which.

Figure 1:
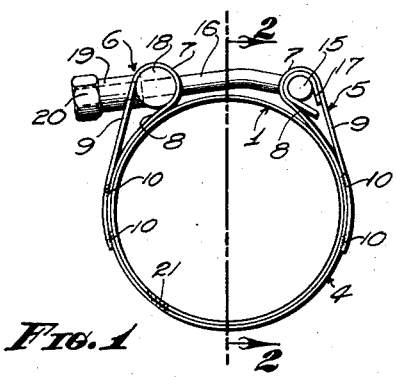
Figure 1 is an axial view of my hose clamp as constructed for smaller diameter tubing.
Figure 2:
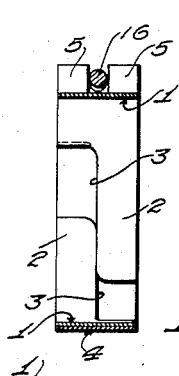
Fig. 2 is a sectional view thereof, through 2—2 of Fig. 1.
Figure 3:
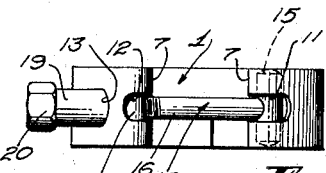
Fig. 3 is a top view thereof.
Figure 4:
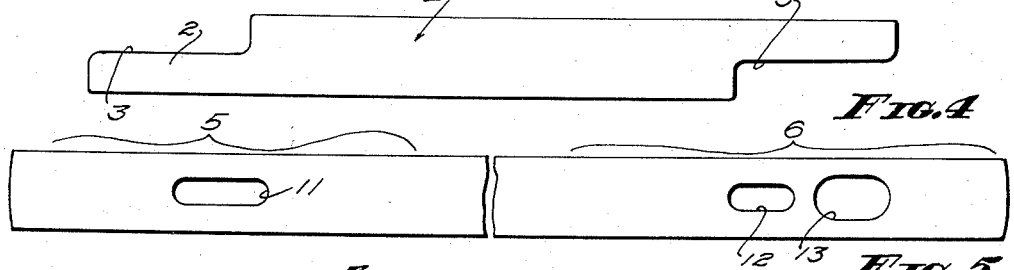
Fig. 4 is a developed view of the inner band member.
Figure 5:
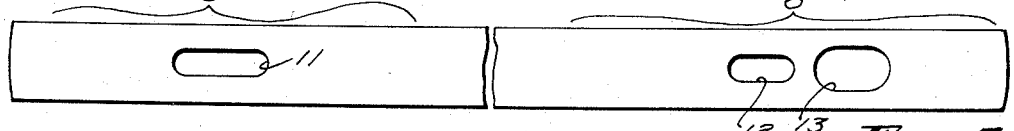
Fig. 5 is a developed view of the outer band member.

Reference is first directed to Figs. 1 through 5. In the construction here shown, my hose clamp includes an inner band 1 formed of relatively flexible sheet material. The band is of uniform width except at its ends which are reduced in width to form tongues 2 adapted, when the band is bent into a circle, to be in complementary position, as shown in Fig. 2; that is each tongue fits into a notch 3 at one side of the other tongue. The inner band is formed into a circle with its tongues 2 circumferentially overlapping and fitted within an outer band 4. The outer band is provided with loop ends 5 and 6 formed by doubling the extremities of the outer band upon itself.

As will be observed from Fig. 1, the loops 5 and 6 are relatively elongated and comprise cylindrical end portions 7 and relatively straight inner and outer radial wall portions 8 and 9 which extend into tangency with the inner band 1. Beyond the point of tangency the walls 8 and 9 of the loops are joined by spot welds 10.

The cylindrical end portion of one loop is provided with a slot 11, whereas the cylindrical end portion of the other loop is provided with a pair of slots 12 and 13. The slot 11 serves to receive a T-bolt 14, comprising a cross member 15 and a leg member 16. The cross member journals within the cylindrical end of the loop whereas the leg member extends through the slot 11. In order to strengthen the connection between the cross member 15 and the T-bolt 14 and the loop end 5, in which it fits, a reinforcing strip 17 may be provided. The leg member 16 extends through the other loop end 6 and through a cylindrical trunnion 18 journaled within the loop 6. The protruding end of the leg member 16 receives a sleeve 19 and a nut 20.

The inner band 1 is spot welded, as indicated by 21, to the outer band 4 and is so oriented that the complementary tongues 2 are disposed within a region in which the outer band 4 is in circumferential contact with the inner band 1, so that in the region of the notch 3 the inner surface of the outer band 4 is exposed to the hose around which the clamp fits. It will thus be seen that in no part of the periphery of the clamp is there any break or space into which the hose can pinch or expand. Furthermore, the outer band 4 tends to hold the inner band 1 in virtually a perfect circle.

The inherent circular form of the inner band 1 is maintained during expansion or contraction of the clamp, whether or not the clamp is surrounding a hose or other tubular member. This demonstrates the fact that a uniform radial completion is obtained which not only insures a good sealing contact between the hose and a tube within the hose but also virtually eliminates any possibility of crushing the inner tube. For this reason the inner tube, to which the hose is attached, may be quite thin or made of low strength material, thereby rendering the clamp particularly useful in connection with aircraft construction because weight is not only saved in the construction of the clamp itself but the parts joined by the clamp.

Figure 6:
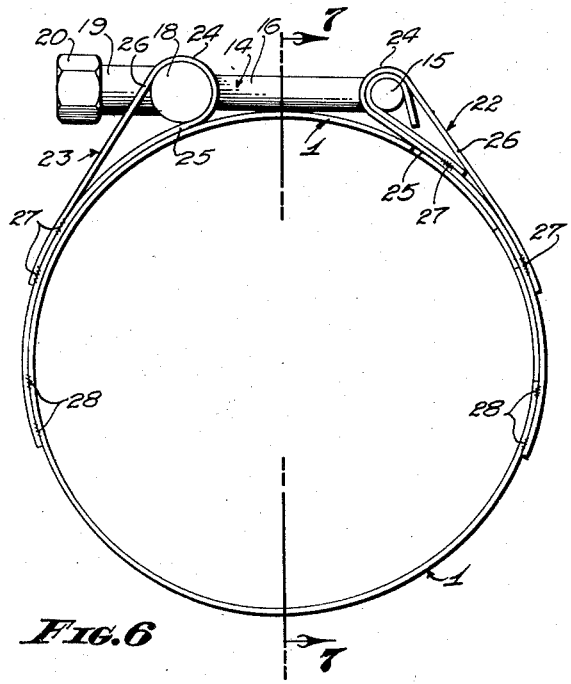
Fig. 6 is an axial view of my hose clamp as employed on large diameter tubing.
Figure 7:
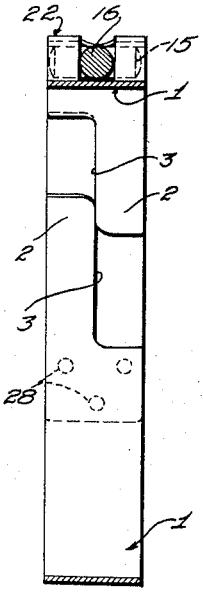
Fig. 7 is a sectional view, taken through 7—7 of Fig. 6.

Reference is directed to Figs. 6 and 7. When it is desired to use my clamp on large diameter tubing it is not necessary that the outer band be continuous. Instead, the outer band may be cut in two, to form two loop end sections 22 and 23, substantially identical to the loop ends 5 and 6; that is, the loop end sections include cylindrical end portions 24 and relatively straight inner and outer walls 25 and 26 which are joined together by spot welds 27. As in the first described structure, the loops are relatively long so that the inner and outer walls 25 and 26 extend into tangency with the circular inner band 1 and then follow the curvature of the inner band 1. The inner walls 25 extend circumferentially beyond the outer walls 26 and are joined by spot welds 28 to the inner band 1, which bridges between the extremities of the loop end sections.

As in the first described structure, the complementary tongue portions of the inner band 4 are located in a region embraced by one of the loop end sections so that for all adjustments of the clamp the connecting ends of the inner band are completely covered and held in circular form by the outer band or loop end section. As in the first described structure, the loop end sections are connected by a T-bolt 14 and associated trunnion 18, sleeve 19 and nut 20.

It has been found desirable in the construction of smaller diameter hose clamps to bend the leg member 16 of the T-bolt 14. However, this is not necessary in the larger diameter clamps.

Having fully described my invention, it is to be understood that I do not wish to be limited to the details herein set forth but my invention is of the full scope of the appended claims.

I claim:

1. A hose clamp, comprising: a radially thin flexible inner band having tongues at opposite extremities adapted to occupy a circumferentially overlapping complementary relation when said band is formed into a cylinder; an outer band having approximately the same thickness as said inner band and having an arcuate portion backing at least that portion of the inner band occupied by said tongues, said outer band having outwardly folded extremities joined to the exterior of said outer band to form loop elements; means joining said inner and outer bands at at least one point in their circumference to prevent circumferential displacement of said tongues from said arcuate backing portion; and means cooperating with said loops to constrict said outer band.

2. A hose clamp as set forth in claim 1, wherein: said outer band is continuous between said loop elements and covers said inner band.

3. A hose clamp as set forth in claim 1, wherein: said outer band is divided into two sections, each secured to said inner band, and a portion of said inner band bridges therebetween.

4. A hose clamp, comprising: an initially flat thin flexible inner strip reduced in width at its extremities to form tongues adapted, when said strip is rolled into a cylinder, to form circumferentially overlapping complementary portions; an arcuate strip of approximately the same thickness as said inner strip overlying and backing said complementary tongue portions; the extremities of said arcuate strip being outwardly folded and joined to the exterior of said arcuate strip to form loop elements; and means connecting said loop elements to constrict said cylinder.

5. A hose clamp, comprising: radially inner and outer band elements formed of thin gage flexible strip members of substantially equal thickness, said inner band having circumferentially overlapping end portions to permit radial expansion and contraction, said outer band including an arcuate portion backing said end portions the extremities of said outer band being folded outwardly and joined to the exterior of said outer band to form spaced loop elements; and adjustable means joining said loop elements to constrict said outer band thereby to constrict said inner band.

6. A hose clamp as set forth in claim 5, wherein: said outer band is continuous between said loop elements; and said inner band is secured to said outer band to prevent circumferential displacement.

7. A hose clamp as set forth in claim 5, wherein: said outer band is discontinuous between said loop elements to form spaced arcuate sections bridged by said inner band, and said inner band is secured to said sections.

8. A hose clamp for thin wall tubes, comprising: a thin gage flexible inner band having tongues at opposite extremities adapted to occupy a circumferentially overlapping complementary relation when said band is formed into a cylinder; a flexible outer band of equal gage thickness to said inner band curved in conformity to and fitted over said inner band, a portion thereof backing said complementary tongues, said outer band being outwardly folded at its extremities to form a pair of loop elements, each loop element having a semi-cylindrical confronting portion and an elongated strap portion formed by the outwardly folded portions of said outer band, said strap portion extending into tangency with the exterior of said outer band and welded thereto; and a T-bolt and trunnion journaled in said loop elements to constrict said bands.

9. A hose clamp as set forth in claim 8, wherein: said outer band is continuous between said loop elements and covers said inner band.

10. A hose clamp as set forth in claim 8, wherein: said outer band is divided into two sections, each secured to said inner band, and a portion of said inner band bridges therebetween.

References Cited in the file of this patent

UNITED STATES PATENTS

| 991,769 | Catelain | May 9, 1911 |
| 1,133,195 | Teeter | Mar. 23, 1915 |
| 1,978,195 | Haas | Oct. 23, 1934 |
| 2,409,576 | Markey | Oct. 15, 1946 |

FOREIGN PATENTS

| 573,695 | Great Britain | Dec. 3, 1945 |